Dec. 6, 1960
S. CSIMMA ET AL
2,963,061
GAUGING MECHANISM FOR PROCESSING MACHINE
Filed Feb. 14, 1958
4 Sheets-Sheet 3
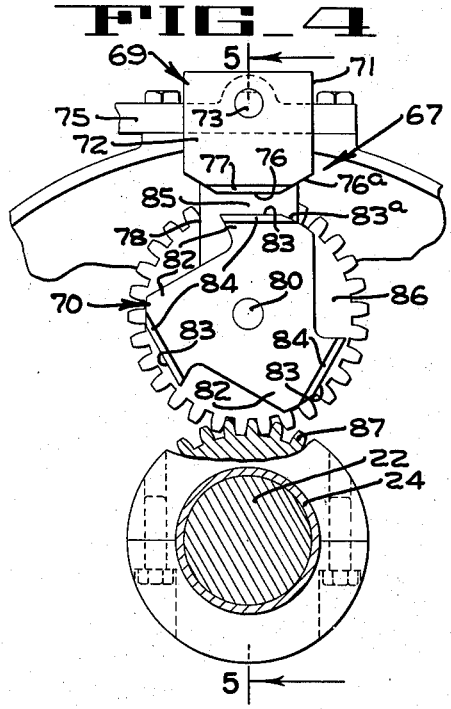
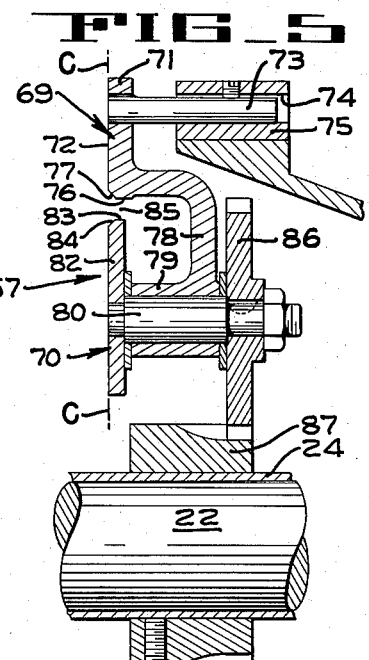
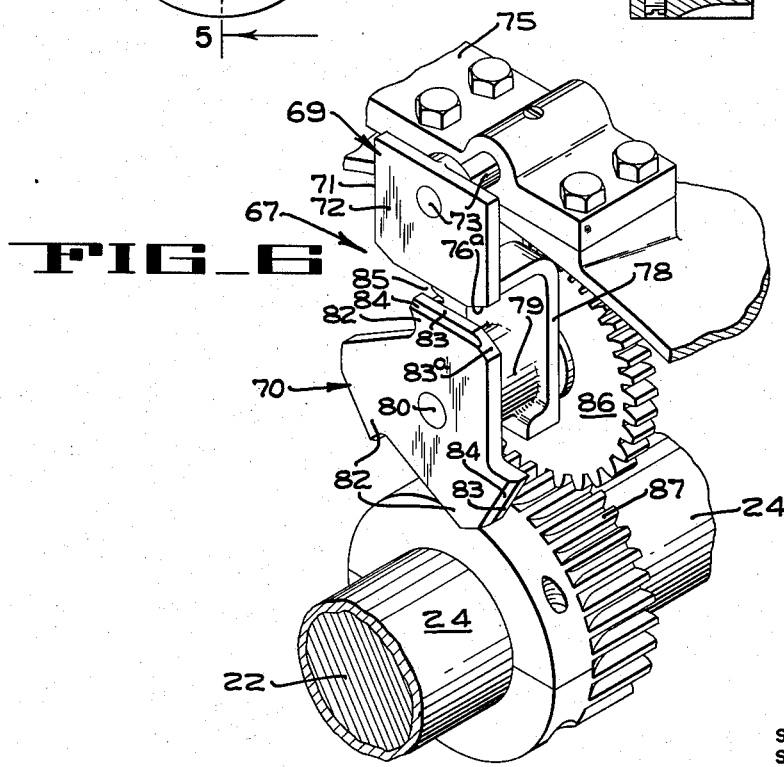
INVENTORS
SANDOR CSIMMA
SHERMAN H. CREED
BY *Hans G. Hoffmeister*
ATTORNEY Dec. 6, 1960 S. CSIMMA ET AL 2,963,061
GAUGING MECHANISM FOR PROCESSING MACHINE
Filed Feb. 14, 1958 4 Sheets-Sheet 4
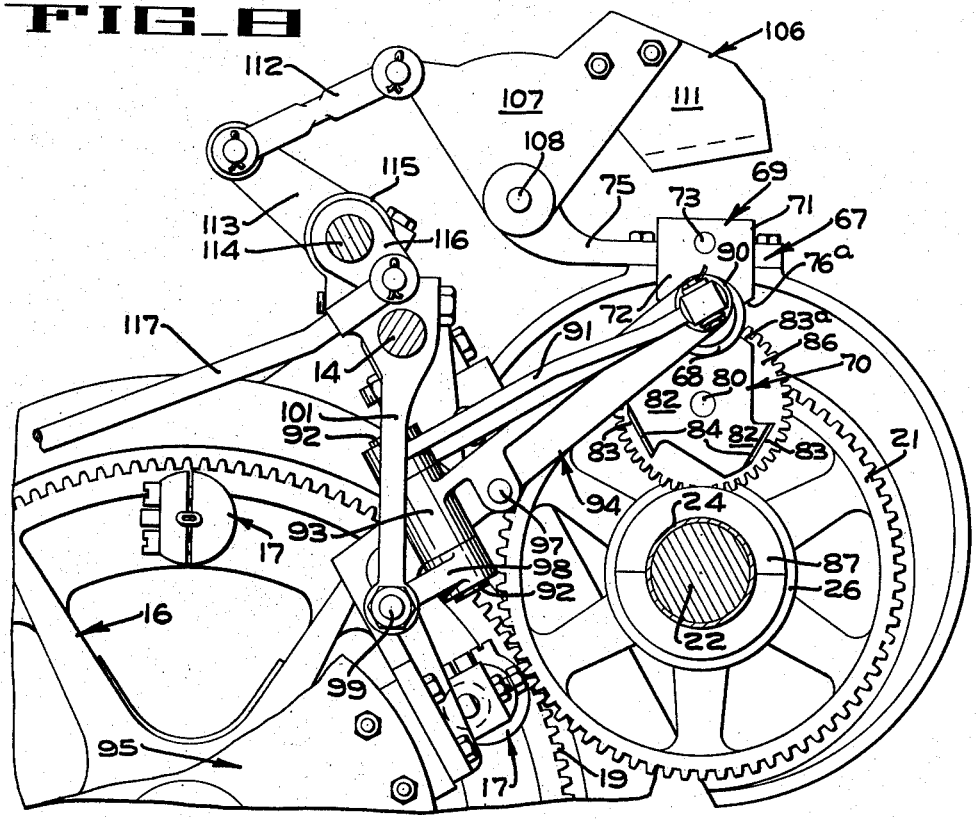
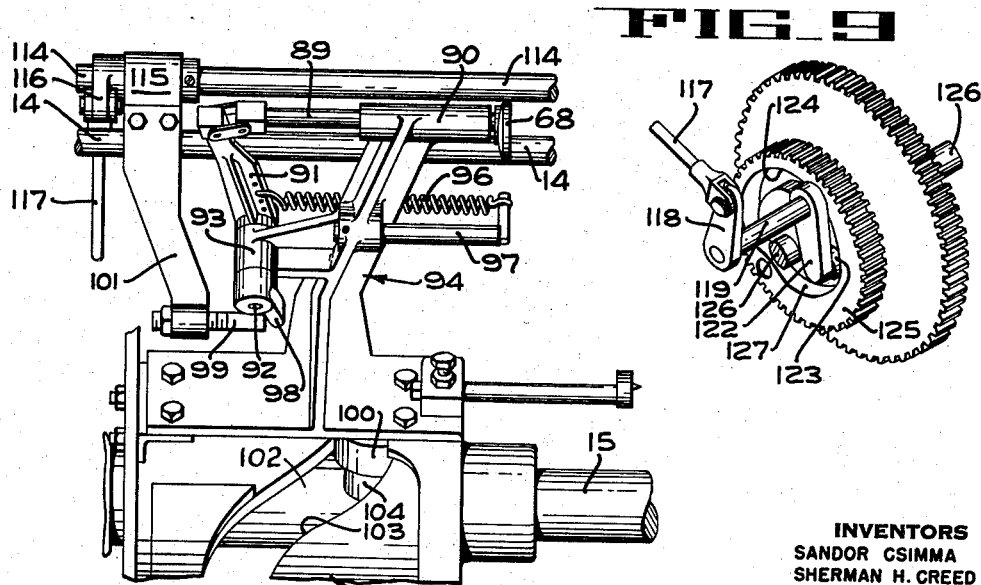
INVENTORS
SANDOR CSIMMA
SHERMAN H. CREED
BY *Hans G. Hoffmeister*
ATTORNEY

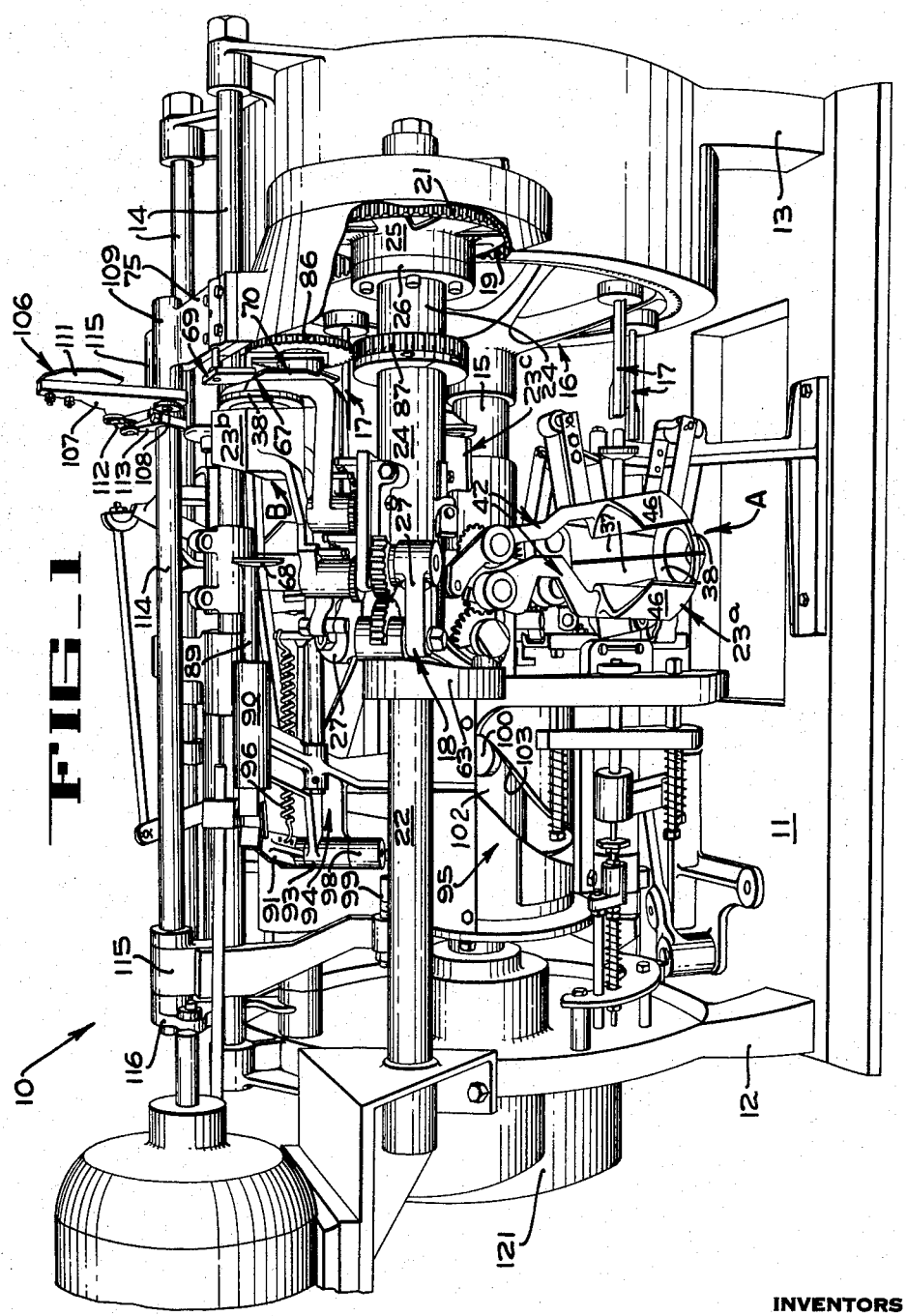

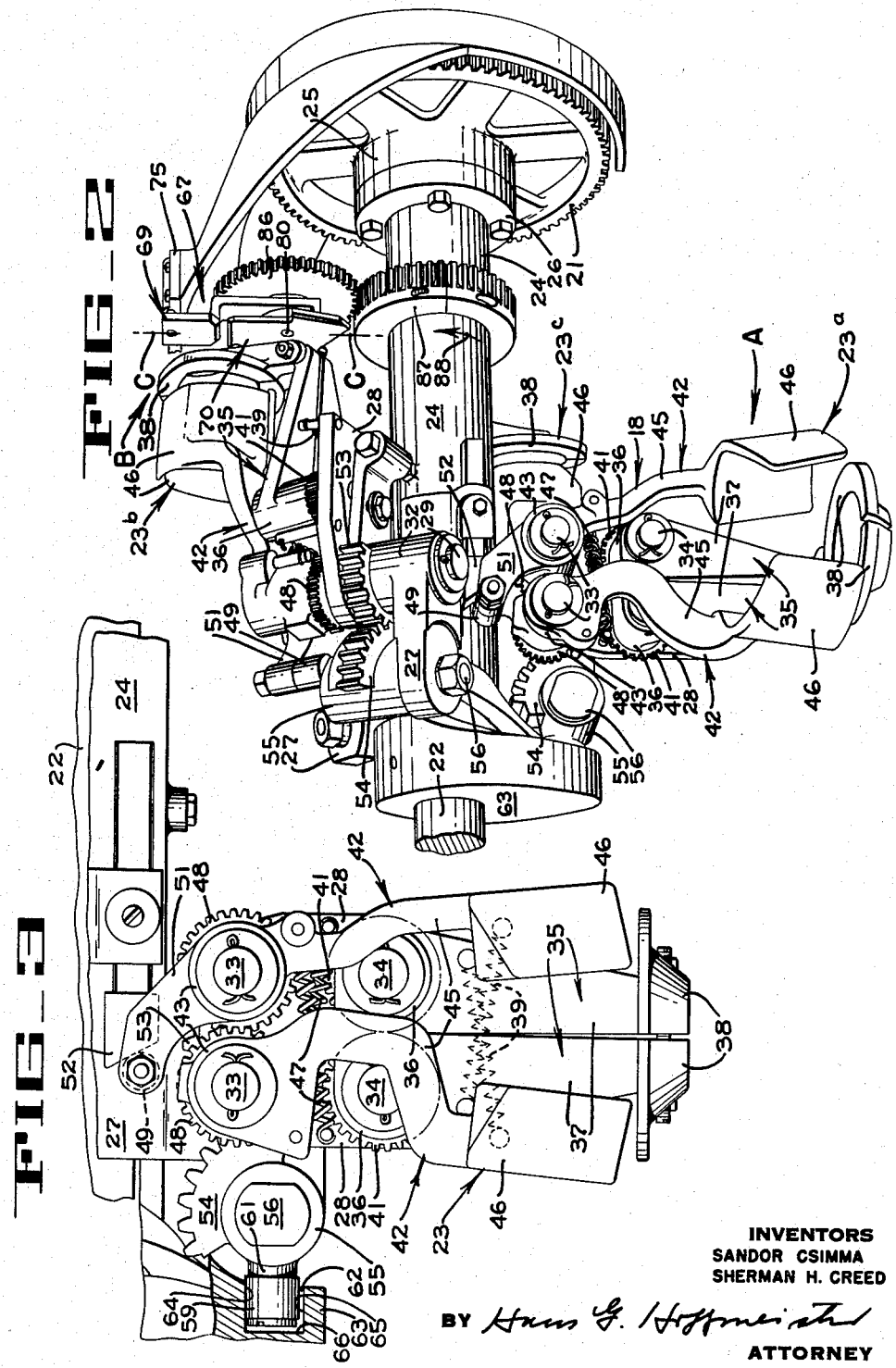

United States Patent Office 2,963,061
Patented Dec. 6, 1960

2,963,061

GAUGING MECHANISM FOR PROCESSING MACHINE

Sandor Csimma, Sunnyvale, and Sherman H. Creed, San Jose, Calif., assignors to Food Machinery and Chemical Corporation, San Jose, Calif., a corporation of Delaware Filed Feb. 14, 1958, Ser. No. 715,414

9 Claims. (Cl. 146—81)

The present invention appertains to a machine for processing fruit, and more particularly to an apparatus for gauging and cutting off the stem end of a pear or other fruit.

An object of the present invention is to provide an improved gauging mechanism that holds and centers the stem end of a fruit when the stem end is severed from the fruit.

Another object is to provide a gauging mechanism that holds the stem end of a fruit when the stem end is severed from the pear, which mechanism automatically removes any residue remaining after the stem end is severed from the fruit.

Another object is to provide a stem end cutting mechanism capable of ejecting the severed stem end outwardly of the machine whereby to prevent an accumulation of stem end residue in the working mechanisms of the machine.

Another object of the present invention is to provide a fruit processing machine wherein the loss of fruit flesh incurred from cutting off the stem end of a fruit is reduced.

Other and further objects and advantages will become apparent from the following description taken in connection with the accompanying drawings, in which:

Fig. 1 is a fragmentary perspective of a pear preparation machine incorporating therein the novel mechanism of the present invention.

Fig. 2 is a fragmentary perspective of the fruit feeding assembly.

Fig. 3 is an enlarged fragmentary elevation of a feed cup of the feeding assembly of Fig. 2.

Fig. 4 is a side elevation of the gauging mechanism of the present invention, certain parts being broken away.

Fig. 5 is a vertical section taken along line 5—5 of Fig. 4.

Fig. 6 is a fragmentary perspective of the gauging mechanism.

Fig. 7 is a fragmentary elevation of a fruit pushing mechanism used in the present machine.

Fig. 8 is an enlarged fragmentary elevation of a bobbing knife assembly.

Fig. 9 is a fragmentary perspective of a drive mechanism for controlling the actuation of the knife assembly.

In Fig. 1, the reference number 10 designates generally a pear processing machine incorporating therein the gauging mechanism of the present invention. Those parts of this machine that are not directly associated with the present gauging mechanism are fully disclosed in the copending U.S. Patent No. 2,905,216 to Marshall E. C. Freeman et al., and in U.S. Patent No. 2,139,704 to Albert R. Thompson et al. Said copending patent and the present application are assigned to a common assignee.

The machine 10, in general, comprises a rigid base 11 upon which is mounted a pair of end standards 12 and 13 rigidly interconnected by suitable longitudinal tie rods 14. A turret drive shaft 15 is journalled for rotation within the standards 12 and 13 and is intermittently rotated by a gear drive arrangement, which is fully described in said Freeman et al. patent.

Fixed to the turret shaft 15 is a turret 16 provided with an annularly arranged series of six stemming tubes 17 (three only being shown), upon which the pears are impaled after being transferred thereto by a turret feed assembly 18. The stemming tubes 17 advance the pear impaled thereon through successive stations wherein the pears are peeled, split, cored and trimmed by mechanisms described fully in the above mentioned patent to Thompson et al.

Gear teeth 19 are formed on the periphery of the turret 16 for meshing engagement with the teeth of a gear 21 (Figs. 1 and 2) that is rotatably mounted on a stationary shaft 22 which is held in fixed position in the end standards 12 and 13. The turret feed mechanism 18 (Fig. 2) comprises three cup assemblies 23a, 23b and 23c which are mounted in spaced angular relation on a sleeve shaft 24. The sleeve shaft 24 is journalled on the stationary shaft 22 for rotation and is connected to a hub 25 of the gear 21 by means of a coupling 26. Thus, the turret feed mechanism 18 is rotated through the turret 16 and the gear 21.

The gear 21 is angularly indexed in one-third of a revolution increments. Hence, the cup assembly 23a (Fig. 2) disposed at feed station A will be shifted by the first indexing to station B (shown in Figs. 1 and 2 as being occupied by cup assembly 23b) at which station the stem end of a pear is cut off. During the second indexing the cup assembly 23a is moved from station B to a position aligned with one of the impaling tubes 17. The third indexing of the gear 21 will bring the cup assembly 23a back to the feed station A.

Each cup assembly 23 (Figs. 2 and 3) is mounted on one of three flanges 27, which are integrally formed in spaced relation on the exterior surface of the sleeve shaft 24 and which extend in a generally radial direction outwardly from the sleeve shaft 24. A flat mounting plate 28, having a stud 29 pressed therein, is included in each cup assembly 23. The stud 29 projects rearwardly from the plate 28 into a bushing (not shown) disposed in a hub 32 formed on the associated flange 27. The rotary movement of the stud 29 in the hub 32 permits movement of the cup assembly as a unit from the pear receiving station A to the stem cut off station B. The mounting plate 28 has two forwardly projecting upper studs 33 and two forwardly projecting lower studs 34. A pair of lower jaw arms 35 are pivotally mounted on the lower studs 34. Each lower jaw arm has a hub 36 disposed on the stud 34, a strap portion 37 extending radially outwardly from the hub 36 in a plane generally parallel to the mounting plate 28, and an end portion 38 of generally semi-circular configuration projecting at right angles from th outer end of the strap 37. The end portions cooperate to define a generally frusto-conical pocket adapted to receive the stem end of a pear. The lower jaw arms 35 are urged toward each other by tension springs 39. To assure simultaneous movement of the lower jaw arms 35, a gear wheel 41 is secured to the rear face of each hub 36 in concentric relation with the aperture in the hub. Since the gear wheels 41 are secured to the hubs 36 and are in meshing relation, pivoting movement of one of the lower jaw arms 35 will cause movement of the other jaw arm 35.

A pair of upper jaws 42 are pivotally mounted on the upper studs 33, which project forwardly from the mounting plate 28. Each upper jaw arm has a hub 43 disposed on the stud 33, and a strap portion or arm 45 which extends radially outward from the hub 43 generally parallel to the mounting plate 28 and offset to clear the hub 36 of the lower jaw arm 35. At its outer end, each upper jaw arm 45 has an end portion 46 of generally semi-cylindrical configuration which projects at right angle to the plane of the mounting plate 28. In closed position, the end portions 46 cooperate to provide a generally cylindrical pocket which is directly above and in axial alignment with the frusto-conical pocket of the lower jaw arms 35. The cylindrical pocket of the upper jaw arms and the frusto-conical pocket of the lower jaw arms cooperate to provide a centering chamber for a pear. The upper jaw arms 42 are urged toward each other by tension springs 47. In order that the upper jaw arms pivot in unison to move the outer end portions 46 toward and away from clamping position around a pear, a gear wheel 48 is pinned to the rear face of each hub portion 43 in concentric relation to the bearing aperture in the hub. The gear wheels 48 mesh and, accordingly, the movement of one upper arm 42 imparts an equal and simultaneous angular movement to the other upper jaw arm. The upper jaw arms are pivoted to closed position by the springs 47 and are pivoted to open position by the contact of a cam roller 49, which is rotatably mounted on a fixed arm 51 projecting upwardly from one of the upper jaw arms 45, with a slanted abutment member 52 that is adjustably mounted on the exterior of the sleeve shaft 24.

Bodily pivotal movement of each cup assembly 23 from station A to station B is effected by the interengagement of a gear segment 53, which is mounted on the rear face of the mounting plate 28, with a gear segment 54 secured to a cylindrical actuating member 55. The gear segment 53 is provided with teeth over an arc of more than 90°, which arc is concentric with the stud 29 that projects rearwardly of the mounting plate 28. The gear segment 54 is provided with teeth over an arc of more than 90°, which arc is concentric with a pin 56 that pivotally mounts the cylindrical actuating member 55 in an aperture in the associated flange 27 of the sleeve 24. When the actuating member is rotated, the mounting plate 28 is rotated to bodily shift the cup assembly 23 mounted thereon from station A to station B.

Each actuating member 55 is rotated about its pivot pin 56 by means of a cam follower sleeve 59, which is rotatably mounted on a stud 61 projecting radially outward from the member 55 at right angles to the axis of rotation of the member 55. The follower 59 rides in a camming groove 62 formed in a cam 63 which controls the position of the cup assembly 23 and is keyed to the stationary shaft 22 on which the sleeve shaft 24 is journalled. The cam 63 has a generally oval configuration. The cam groove 62 has sidewalls 64 and 65 and a bottom wall 66 which cooperate to define a groove of generally rectangular cross-section. At its lower end the sidewalls 64 and 65 are disposed parallel to the axis of the stationary shaft 22 and, therefore, when the cam follower 59 passes through this portion of the groove, the axis of the follower will be held in a position parallel to the stationary shaft 22. This corresponds to the position of the cup assembly at station A, wherein the cup assembly is in the pear receiving position. The sidewalls and the bottom wall of the grooves are progressively inclined so that the rectangular groove is gradually twisted. Accordingly, if the sleeve shaft 24 is rotated in a direction so that the cam follower moves counterclockwise (Fig. 2) around the shaft 22, the follower 59 will be tilted as it leaves station A due to the inclination of the walls of the groove 62. By the time the sleeve shaft 24 has travelled 120° of rotation, the cam follower 59 will be turned from its original position parallel to the horizontal shaft 22 to a position at right angles to the shaft and projecting in a direction radially outwardly of the shaft. This position corresponds to the position of a cup assembly when at station B. At this time the axis of the associated cup assembly will be parallel to the horizontal shaft 22 and aligned with a gauging mechanism 67 (Fig. 1) to be described in detail hereinafter.

Summarizing the movement of the cup assemblies 23, it will be seen that the sleeve shaft 24 is rotated intermittently in 120° increments. A cup assembly 23 starting at the pear receiving station A is swung during the first 120° of shaft rotation from a position with the cup axis generally normal to a horizontal plane through the shaft 22 to a position with the cup axis substantially parallel to the horizontal plane and in alignment with the gauge mechanism 67. During the second 120° of rotation the axis of the cup assembly is aligned with a stemming tube 17. Since the mounting flanges 27 are spaced around the sleeve shaft 24 at equal angular distances, the three cup assemblies 23 are spaced at equal angular distances. Accordingly, when one cup assembly is at the pear receiving station A, the preceding cup is at the stem end cut off station B and the third cup assembly is at the position where a pear is transferred to one of the stemming tubes 17.

When a cup assembly has returned to the pear receiving station A, the roller 49 on the upper jaw end of the upper jaw arm 45 has contacted the abutment member 52 and pivoted the upper jaws to open position whereby a pear may be easily placed in the cup with the stem end down. As the cup assembly advances beyond station A, the sleeve shaft 24 rotates and the roller 49 is moved away from the abutment member 52 to permit the tension springs 47 to close the jaws of the cups against the pear held therein. The pear is advanced from the feed station A to the stem cut off station B by the angular indexing of the sleeve shaft 24 and is held in a clamped position in the cups. As the pear advances to station B, it is held in the cup with its stem-blossom axis aligned between the gauging mechanism 67 (Fig. 1) and a pusher plate 68 (Fig. 1) with the stem end of the pear toward the gauging mechanism 67.

According to the present invention, the gauging mechanism 67 (Figs. 4, 5 and 6) comprises an upper stationary gauge plate 69 and a lower rotatable plate 70. The upper stationary gauge plate 69 has a forward portion 71 with a flat face 72. A shaft 73, which has a flattened upper surface, projects rearwardly from the forward portion 71 and is received in a mating aperture 74 in a bracket 75 (Figs. 1 and 2) which is secured to the housing of the machine. At the lower end of the forward portion 71 there is provided a horizontal gauging face 76 having a downwardly and inwardly directed bevelled edge 77. The stationary gauge plate 69 also includes an offset portion 78 having the upper end thereof disposed as a continuation of the gauging face 76. Integrally formed with the offset portion 78 is a boss 79 defining a shaft-receiving opening and having a horizontally disposed stub shaft 80 journalled for rotation therein.

Mounted on one end of the stub shaft 80 for rotation therewith is the lower rotatable gauge plate 70 that includes three generally radially projecting arms 82 (Fig. 4) spaced at equal angular distances relative to the axis of shaft 80. Each radially projecting arm 82 terminates in an elongated flat gauging face 83 having a bevelled edge 84. The gauge plate 70 is rotatable in a vertical plane and is aligned with respect to the stationary gauge plate 69 so that a vertical plane C—C (Figs. 2 and 5) passes through the outer vertical surfaces of both the stationary gauge plate 69 and the rotatable gauge plate 70. The plane C—C is located at a predetermined distance from the end portion 38 of the cup positioned at station B so as to leave clearance for a bobbing knife employed to sever the stem end from the pear held by the cup at station B. As shown in Figs. 4, 5 and 6, the rotary gauging faces 83 of the rotatable gauge plate 70 are arranged to be successively advanced to a position opposite the stationary gauging face 76 of the stationary gauge plate 69. Each rotatable gauging face 83, when positioned opposite the stationary gauging face 76, is horizontally disposed with the bevelled edge 84 thereof directed in an upwardly and inwardly direction. When one of the rotary gauging faces 83 is horizontally disposed and opposite the stationary gauging face 76, it is parallel to the face 76 and spaced therefrom a predetermined vertical distance to form a horizontal slot 85 suitable for receiving the stem end of the pear that is held by the cup at station B. Also, the upper gauge plate 69 and the lower plate 70 has bevelled edges 76a and 83a, respectively, at the entrance edge of the gauge. If the pear that is being moved into alignment with the gauge plate has a long stem, the stem will contact one of the bevelled edges 76a or 83a and be guided into the slot 85.

When the pear is aligned with the gauge plate the pusher plate 68 moves forwardly to engage the butt end of the pear and push it into contact with the gauge plate. The bevelled edges 77 and 84 tend to shift the pear in a vertical direction and move it to a position wherein the stem-blossom axis of the pear is substantially horizontal. Also the edges 77 and 84 tend to grip the nose of the pear and prevent it from moving as a cutting knife cuts off the stem end of the pear. As will be explained in detail presently the cutter is mounted a fixed distance from the face of the gauge plate. Accordingly, all pears will have the same amount cut from their stem ends. Thus, it is to be observed that the gauging mechanism 67 is arranged for gauging, centering, and holding the stem end of a pear when the pear is urged into contact with the mechanism at the stem cut off station B.

At the other end of the stub shaft 80 is keyed a driven gear 86, whereby rotation of the gear 86 imparts a rotatable movement to the rotatable gauge plate 70 through the shaft 80. Meshing with the gear 86 is a drive gear 87 that is mounted on and keyed to the sleeve shaft 24 for rotation therewith. The gears 86 and 87 are so arranged that one complete revolution of the sleeve shaft 24 in a counterclockwise direction, as viewed in Fig. 4, rotates the rotatable gauge plate 70 one complete revolution in a clockwise direction, as viewed in Fig. 4. As previously described, the sleeve shaft 24 is indexed to rotate intermittently in 120° increments. Each 120° rotation of the sleeve shaft 24 positions one of the cup assemblies 23 at the stem cut off station B. With the stub shaft 80 rotating in unison with the sleeve shaft 24 and with the three radial arms 82 spaced at 120° intervals on the rotatable gauge plate 70, the rotary gauge plate 70 is so fixed to the shaft 80 that one of the gauging faces 83 is disposed opposite the stationary gauging face 76 each time one of the cup assemblies 23 is positioned at the cut off station B.

After the stem end of the pear at station B is severed from the pear in a manner to be described hereinafter, the cup assemblies 23 are rotated by the indexing of sleeve shaft 24 in the direction shown by an arrow 88 (Fig. 2) and the cup assembly 23 positioned at station B is advanced for transferring the pear held thereby to one of the impaling tubes 17. Simultaneously, the rotary gauge plate 70 is rotated in a clockwise direction (Fig. 4) and the severed stem end, which is held by the gauging mechanism 67, is removed and ejected from the gauging mechanism 67 through the action of the lower rotary gauge plate 70. When the stem end of the pear is severed, it is held between the stationary gauging face 76 and the rotary gauging face 83 of one of the radial arms 82. As the rotary gauge plate 70 is rotated, the gauging face engages the severed stem end and ejects it in a direction outwardly of the machine. Thus, the severed stem end is positively pushed or propelled away from the other operating mechanisms such as the peeling units.

As previously described, the cup assembly at station B holds a pear in clamped position in the cup with its stem-blossom axis substantially aligned with both the horizontal slot 85 of the gauging mechanism 67 and the pusher plate 68. While a pear is held in the aligned position at station B, the pusher plate 68 is moved into contact with the butt end of the pear to firmly urge it into the centering chamber of the cup to center the pear therein and to positively press the stem end of the pear into the horizontal slot 85 for gauging, centering and holding the stem end of the pear by the gauging mechanism 67.

The pusher plate 68 (Fig. 7) is mounted on the end of a rod 89 which is slidably journalled in a support tube 90 and is reciprocated toward and away from the cup assembly after the cup assembly arrives at station B. To effect the reciprocation of the pusher plate, one end of the pusher plate rod 89 is pivotally connected to an arm 91 that is keyed on a shaft 92 rotatably journalled in a cylindrical bearing member 93. The bearing member 93 and the tubular member 90, which supports the push rod 89, are both integrally formed on a bracket 94 which is secured to the sidewall of a movable carriage in the form of a cylindrical cam 95. A tension spring 96 is connected between arm 91 and a rod 97, adjustably mounted on the bracket 94, and is arranged to pivot the arm 91 and the shaft 92 in a clockwise direction (Fig. 7). A second arm 98 is keyed to the shaft 92 and is arranged to abut against a stop member 99, which is adjustably mounted on a bracket 101 secured to one of the tie rods 14. Reciprocation of the bracket 94 is obtained by reciprocating the cam cylinder 95 on which the bracket is mounted. The cylindrical cam is slidably supported on a sleeve 102 which is rotatably mounted on the turret shaft 15. A camming slot 103 on the cam 95 receives a roller 100 which is mounted on the outer end of a rod 104 projecting radially from the sleeve 102. The sleeve 102 is rotated by gears in a manner fully described in the aforementioned Freeman et al. patent. The camming slot 103 has a straight portion disposed at right angles to the axis of the cylindrical cam. When the continuously moving roller 100 traverses this straight portion, there will be no axial movement of the cylindrical cam. Between the ends of the straight portion, the camming slot is inclined in one axial direction to cause movement of the cylindrical cam in one direction longitudinally, and is inclined in the opposite axial direction to cause movement of the cylindrical cam in the opposite direction. It will be evident that the gear drive of the sleeve shaft 102 can be so chosen that the cylindrical cam 95 is reciprocated immediately after a cup assembly is indexed to the stem cut-off station B.

In the operation of the pusher plate 68, the cylindrical cam 95 moves toward the right in Fig. 7 causing the arm 98 to move away from the stop 99 and the tension spring 96 is permitted to pivot the arm 91 to slide the pusher rod 89 toward the pear. As the cylindrical cam continues its movement toward the right, the pusher plate 68 is brought into contact with the butt end of the pear. In this manner, the spring loaded pusher plate 68 urges the pear into centered position in the cup assembly and positively presses the stem end of the pear into the horizontal slot 85 of the gauge mechanism for gauging, centering and holding the stem end of the pear by the gauging mechanism 67. After the pear is seated and the stem end thereof is severed, the pusher plate 68 is retracted to its dwell position.

When the pear is firmly seated in the cup with its stem end received by the slot 85 of the gauging mechanism 67, a knife 106 (Figs. 1 and 8) moves from a raised position to a lower position in a vertical plane transversely to the stem-blossom axis of the pear to cut off the stem end of the pear. The vertical plane defined by the lowering movement of the knife (Fig. 2) is located between the end portion 38 of the cup and the plane C—C which is defined by the outer vertical surfaces of the stationary gauge plate 69 and the rotary gauge plate 70. The knife 106 comprises a body portion 107 rotatably mounted by means of a pin 108 in a boss 109 (Fig. 1) of the bracket 75. A cutting blade 111 (Fig. 8) is secured to one side of the body portion 107 and a link 112 is pivotally connected to the other side of the body portion. The link 112 is pivotally connected to an arm 113 that is keyed to a shaft 114. The shaft 114 extends longitudinally of the machine and is journalled for rotation in spaced bearings 115, which are secured to one of the tie rods 14. A lever 116 is keyed at one end to the shaft 114 and is pivotally connected at its opposite end to a link 117 that extends transversely of the machine and is pivotally connected to a lever 118 (Fig. 9) which in turn is keyed to a shaft 119 journalled in a gear housing 121 (Fig. 1). A cam follower lever 122 is keyed to the shaft 119 and has a roller 123 arranged to ride in a groove 124 formed in the face of a gear 125, which rotates with a continuously rotating shaft 126. The gear 125 and the shaft 126 are part of the gear drive previously referred to and are described in detail in the aforementioned Freeman et al. patent. The cam groove 124 has a camming surface 127 designed to actuate the lever 122 and rotate the shaft 119 in a direction to pull the link 117 toward the left as seen in Fig. 8. This movement of the link 117 causes clockwise rotation of the longitudinal shaft 114 and downward pivoting of the knife 106. It is to be observed that the knife 106 cuts the stem end of the pear between the end portion 38 of the cup assembly and the gauging mechanism 67. Since the gauging mechanism supports the end of the pear, no other stem end support apparatus is necessary, and the knife may pass close to the face of the gauging mechanism. This results in a reduction of fruit flesh loss that is incurred from cutting off the stem end of the pear when an auxiliary stem end support is needed and used.

In the operation, a pear is placed in a cup assembly 23 position at station A with the stem end of the pear down. The sleeve shaft 24 is indexed to advance the cup assembly to station B and the pear is held in the cup with its stem-blossom axis aligned between the horizontal slot 85 of the gauging mechanism 67 and a pusher plate 68 with the stem end of the pear toward the gauging mechanism 67. While the pear is held in the aligned position at station B, the pusher plate 68 is moved into contact with the butt end of the pear to firmly urge it into the centering chamber of the cup to center the pear therein and to positively press the stem end of the pear into the horizontal slot 85 of the gauging mechanism 67 for gauging, centering and holding the stem end of the pear by the gauging mechanism 67. The knife 106 is lowered transversely to the stem-blossom axis of the pear to cut off the stem end of the pear, which is held by the rotary gauge plate 70 and the stationary gauge plate 69. The pusher plate 68 is retracted. The severed stem end of the pear is retained temporarily by the gauging mechanism 67. The knife 106 is raised to its elevated position. The sleeve 24 is once again indexed to advance the cup assembly 23 at station B in the direction of arrow 88 (Fig. 2) for transferring the served pear to one of the impaling tubes and to advance the cup assembly at station A to station B. Simultaneously, the rotary gauge plate 70 is rotated in a clockwise direction (Fig. 4) to discharge the severed stem end outwardly of the machine and not toward the peeling mechanisms. As the succeeding cup assembly is positioned at station B, the succeeding rotary gauging face 83 is disposed opposite the stationary gauging face 76 to form the succeeding horizontal slot 85.

It will be understood that modifications and variations of the embodiments of the invention disclosed herein may be resorted to without departing from the spirit of the invention and the scope of the appended claims.

Having thus described our invention, what we claim as new and desired to protect by Letters Patent is:

1. A gauging mechanism adapted for use in fruit processing machines comprising a stationary gauge plate having a stationary gauging face, a rotary gauge plate spaced from said stationary gauge plate and having a generally radially projecting arm terminating in a movable gauging face, and means operatively connected to said rotary gauge plate to intermittently rotate said rotary gauge plate for disposing said movable gauging face in a stationary position opposite said stationary gauging face to form therewith an aperture for receiving a portion of a fruit, whereby the portion of the fruit received by said aperture is held by said stationary and rotary gauge plates between said stationary and movable gauging faces, said rotary gauge plate being arranged during each intermittent movement thereof to discharge fruit fragments held between said stationary and movable gauging faces.

2. A gauging mechanism adapted for use in fruit processing machines comprising a stationary gauge plate having a stationary gauging face, a rotary gauge plate spaced from said stationary gauge plate and having a plurality of generally radially projecting arms, each of said arms terminating in a movable gauging face, and means operatively connected to said rotary gauge plate for intermittently rotating said rotary gauge plate to successively position each of said movable gauging faces opposite said stationary gauging face to form successive slots for receiving the stem end of successively advancing fruit.

3. A gauging mechanism adapted for use in fruit processing machines comprising a stationary gauge plate having a stationary gauging face, a rotary gauge plate spaced from said stationary gauge plate and having a generally radially projecting arm terminating in a movable gauging face, each of said gauging faces having a beveled edge, and means operatively connected to said rotary gauge plate to intermittently rotate said rotary gauge plate for disposing the beveled edge of said movable gauging face opposite the beveled edge of said stationary gauging face to form a slot between said gauging faces for receiving a portion of a fruit, whereby said portion of the fruit received by the slot is centered by said beveled edges and held by said gauge plates between said gauging faces.

4. A gauging mechanism adapted for use in fruit processing machines comprising a vertically disposed front face section having at its lower end a horizontally disposed gauging face, an offset section having its upper end adjacent said gauging face and having at its lower end a horizontally disposed shaft-receiving opening, a shaft journalled in said opening for rotation, a rotatable gauge plate fixed to said shaft for rotation therewith and spaced from said front face section in vertical alignment, said rotatable gauge plate including a generally radially projecting arm terminating in a gauging face disposed at right angles to said radial arm, and means operatively connected to said shaft for rotating said shaft to position the gauging face of said arm opposite said horizontally disposed gauging face to form therewith a horizontal slot to receive a portion of a fruit, whereby the portion of the fruit received by said slot is held between the gauging face of said arm and said horizontal gauging face.

5. In a fruit processing machine of the type having a rotatable fruit feeding assembly with a plurality of cups for holding fruit, means for rotating said feed assembly and fruit supported thereby to advance said fruit holding cups successively to position a fruit in one of said cups with its stem blossom axis extending in a predetermined direction, pusher means for engaging the butt end of the fruit in the cup and moving the fruit in said predetermined direction along its stem blossom axis, and means for severing the stem end of the fruit held in said cup, the improvement which comprises a gauging mechanism comprising a stationary gauge plate having a stationary gauging face disposed adjacent the stem end of the fruit, a rotary gauge plate spaced from said stationary gauge plate and having a plurality of movable gauging faces arranged to form successive gauging apertures with said stationary gauging face, each of said gauging apertures when formed being arranged to receive the stem end of the fruit to support the stem end of the fruit in position to be cut off, and means operated simultaneously with the rotation of the fruit to rotate said rotary gauge plate to eject the severed stem from between said gauging plates as the succeeding fruit is advanced to position the stem blossom axis thereof in alignment with a succeeding one of said gauging apertures and to form said succeeding gauging aperture.

6. In a fruit processing machine of the type having a rotatable fruit feeding assembly including a plurality of cups for holding fruit, means for rotating said feed assembly and fruit supported thereby to advance said fruit holding cups successively to a position in which the stem blossom axis of the fruit extends in a predetermined direction, pusher means for engaging the butt end of the fruit in the holding cup and moving the fruit in said predetermined direction along its stem blossom axis, and means for severing the stem end from the fruit, the improvement which comprises a gauging mechanism comprising a stationary gauge plate having a stationary gauging face disposed adjacent the stem end of the fruit, a rotary gauge plate spaced from said stationary gauge plate and having a plurality of movably gauging faces arranged to form successive gauging apertures with said stationary gauging face, each of said gauging apertures when formed being arranged to receive and support the stem end of a fruit in position to be cut off, and means operated simultaneously with the rotation of said fruit to rotate the rotary gauge plate in a direction opposite to the direction of rotation of said fruit to discharge the severed stem held between said gauge plates as the succeeding fruit is advanced to position the stem blossom axis thereof in alignment with a succeeding one of said gauging apertures and to form said succeeding gauging aperture.

7. A gauging mechanism adapted for use in fruit processing machines comprising a first gauge member having a gauging surface, a second gauge member having a plurality of spaced gauging surfaces, means mounting said second gauge member for movement relative to said first gauge member, and means for moving said second gauge member to a plurality of positions in each of which one of the gauging surfaces thereof cooperates with the gauging surface of said first gauge member to define a gauging aperture.

8. A gauging mechanism adapted for use in fruit processing machines comprising a stationary gauge member having a gauging surface, a rotary gauge member mounted adjacent said stationary gauge member and having a plurality of spaced peripheral gauging surfaces, and means for rotating said rotary gauge member to selectively position one of the gauging surfaces thereon in opposed spaced relation to the gauging surface of said stationary gauge member to provide a gauging aperture adapted to receive the stem end of a pear.

9. In a fruit processing device, a gauging mechanism comprising stationary means having an elongated face, a coacting rotary means having an elongated face opposed to said stationary face, said face of said rotary means having a portion thereof which upon rotation thereof is more closely spaced with respect to said stationary face than the remaining portions thereof, whereby when the stem end of a fruit is engaged between said surfaces and the same severed, rotation of said rotary means will cause ejection of the cut-off portion.

References Cited in the file of this patent

UNITED STATES PATENTS 2,699,191     De Back et al. _____ Jan. 11, 1955
2,712,334     Bridge _____ July 5, 1955